United States Patent
Matsuwaka et al.

(10) Patent No.: US 12,152,288 B2
(45) Date of Patent: Nov. 26, 2024

(54) METHOD FOR PRODUCING TI—AI ALLOY

(71) Applicant: Kobe Steel Co., Ltd., Kobe (JP)

(72) Inventors: Daisuke Matsuwaka, Hyogo (JP); Shorin O, Hyogo (JP)

(73) Assignee: Kobe Steel Co., Ltd., Kobe (JP)

( * ) Notice: Subject to any disclaimer, the term of this patent is extended or adjusted under 35 U.S.C. 154(b) by 333 days.

(21) Appl. No.: 17/758,948

(22) PCT Filed: Feb. 3, 2021

(86) PCT No.: PCT/JP2021/003995
§ 371 (c)(1),
(2) Date: Jul. 15, 2022

(87) PCT Pub. No.: WO2021/157628
PCT Pub. Date: Aug. 12, 2021

(65) Prior Publication Data
US 2023/0048245 A1    Feb. 16, 2023

(30) Foreign Application Priority Data
Feb. 3, 2020 (JP) .................................. 2020-016221

(51) Int. Cl.
B22D 21/00 (2006.01)
C22C 1/02 (2006.01)
C22C 14/00 (2006.01)

(52) U.S. Cl.
CPC ............ *C22C 1/026* (2013.01); *B22D 21/007* (2013.01); *C22C 14/00* (2013.01)

(58) Field of Classification Search
CPC .... B22D 21/005; B22D 21/007; B22D 21/04; C22B 9/10; C22C 14/00
See application file for complete search history.

(56) References Cited

U.S. PATENT DOCUMENTS

2017/0283906 A1   10/2017   Kudo et al.
2020/0377972 A1   12/2020   Kudo et al.

FOREIGN PATENT DOCUMENTS

EP    1045216 A2 * 10/2000   ......... C22B 34/1295
JP    2007240102 A  *  9/2007
(Continued)

OTHER PUBLICATIONS

Clarivate machine translation of JP 2016-135907 A (Year: 2016).*
International Search Report Issued Mar. 23, 2021, in PCT/JP2021/003995, filed on Feb. 3, 2021, 3 pages.

*Primary Examiner* — Kevin E Yoon
(74) *Attorney, Agent, or Firm* — Oblon, McClelland, Maier & Neustadt, L.L.P.

(57) ABSTRACT

Production methods for Ti—Al alloys may include: adding a flux including calcium oxide containing 35+wt. % calcium fluoride, to a melt starting material of Ti material and Al material and with 50+wt. % Al; introducing the fluxed melt starting material into a water-cooled copper crucible having a tapping port in the bottom, induction melting it inside the water-cooled copper crucible in at least a 1.33 Pa atmosphere; the flux, containing oxygen released from the melt starting material by the induction melting, is separated out by tapping the melt starting material, which was induction melted in the water-cooled copper crucible, downward from the tapping port; and when obtaining the Ti—Al alloy by casting the flux-removed melt starting material, the induction melting output is reduced to no more than 90% of that during melting and tapping is performed from the water-cooled crucible with the output in a reduced state.

6 Claims, 2 Drawing Sheets

(56) References Cited

FOREIGN PATENT DOCUMENTS

| JP | WO 2016/035824 A1 | 3/2016 |
|----|-------------------|--------|
| JP | 2016-135907 A | 7/2016 |
| JP | 2018-134675 A | 8/2018 |
| JP | 2018-178242 A | 11/2018 |

* cited by examiner

METHOD FOR PRODUCING TI—Al ALLOY

CROSS-REFERENCE TO RELATED APPLICATIONS

The present application is the national stage of international application PCT/JP2021/003995, filed on Feb. 3, 2021, and claims the benefit of the filing date of Japanese Appl. No. 2020-016221, filed on Feb. 3, 2020.

TECHNICAL FIELD

The present invention relates to a method for producing a high-grade, that is, low-oxygen Ti—Al alloy, in which deoxidation is conducted by melting a mixture of an aluminum raw material and a low-grade titanium raw material containing a large amount of titanium oxide ($TiO_2$), for example lower sponge titanium, scrap titanium, and rutile ore.

BACKGROUND ART

In recent years, demand for a Ti—Al alloy as a raw material for airplanes and automobiles is growing. Since the Ti—Al alloy is very active to oxygen, melting and casting is conducted by use of a method capable of reducing the influence of oxygen, such as a vacuum arc remelting method (VAR), an electron beam melting method (EB), a plasma arc melting method (PAM), a vacuum induction melting (VIM) and a cold crucible induction melting (CCIM).

Among those melting and casting methods, in the melting method such as VAR, EB or VIM, a melting process is performed under a vacuum atmosphere. Because not only Al but also Ti as an alloy element are evaporated during the melting process, it is difficult to control the composition after melting in the industrial process, and there is a fear that an increase in the production cost is incurred.

Accordingly, a technique for producing a Ti—Al alloy is proposed, in which a melting method such as PAM or CCIM is used, instead of a melting method such as VAR, EB or VIM easily causing a loss of Ti due to volatilization, and deoxidation is conducted from a low-grade raw material (a titanium raw material having a high oxygen content of 0.1 mass % or more) while reducing a volatilization loss of Al or Ti.

For example, Patent Literature 1 describes the followings. In a case where 40 mass % or more of Al is added to Ti having a high oxygen content, followed by melting and retaining under an atmosphere of 1.33 Pa or more by use of PAM or CCIM, oxygen in a Ti—Al alloy is coupled with Al to form $Al_2O_3$ and the $Al_2O_3$ is discharged from the Ti—Al, thereby deoxidization is advanced. In addition, when a $CaO$—$CaF_2$ flux is added, the activity of $Al_2O_3$ is reduced to further advance the deoxidization.

However, since a part where $Al_2O_3$ or the flux remains exists in the Ti—Al alloy, when pure Ti is added to it to produce a Ti—Al alloy having an Al content of lower than 40 mass %, the $Al_2O_3$ or the like inside the flux is decomposed/remelted to increase the oxygen concentration or the like again. Therefore, it is not easy to obtain a high-grade, that is, low-oxygen Ti—Al alloy having an Al content of lower than 40 mass %, by the production method of Patent Literature 1.

Patent Literature 2 and Patent Literature 3 propose a technique of producing titanium aluminum having a low oxygen concentration as follows: when a flux is caused to act on titanium aluminum to remove oxygen, a composition of the flux is defined as a desired composition; or a melting raw material is divided into a plurality of pieces, and the casting operation in which a draw-down speed of a slab from a water-cooled copper crucible or the like is defined is repeated a number of times corresponding to the number of divisions.

CITATION LIST

Patent Literature

Patent Literature 1: JP-A-2016-135907
Patent Literature 2: JP-A-2018-178242
Patent Literature 3: JP-A-2018-134675

SUMMARY OF INVENTION

Technical Problem

In the methods of Patent Literature 2 and Patent Literature 3 described above, since there is a part where $Al_2O_3$ or the like remains tends to be exist at the surface of the cast slab, a low-oxygen Ti—Al alloy having an oxygen content of less than 0.1 mass % can be obtained if the part where $Al_2O_3$ or the like remains is mechanically removed by shot blasting or the like and then high-grade, that is, low-oxygen Ti is added and melted.

However, the part where $Al_2O_3$ or the like remains, which cannot be reused, has to be discarded, and a part of metal Ti is also removed together with the discarded $Al_2O_3$ or the like. Therefore, the yield of the Ti—Al alloy becomes very poor, leading to an increase in cost. That is, in the methods of Patent Literature 2 and Patent Literature 3, in which a high-grade Ti—Al alloy is obtained by mechanical means, a high-grade Ti—Al alloy cannot be obtained at a high yield.

In the methods of Patent Literature 2 and Patent Literature 3, although the part where $Al_2O_3$ or the like remains is mechanically removed by shot blasting or the like, it is not possible to remove all $Al_2O_3$ by this mechanical means. Therefore, $Al_2O_3$, which has not been completely removed by mechanical means, is decomposed or remelted when pure Ti or the like is added, and there is also a limit in reducing the oxygen content of the Ti—Al alloy.

The present invention has been made in view of the above problems, and an object of the present invention is to provide a method for producing a Ti—Al alloy, by which the oxygen content of the produced Ti—Al alloy can be further reduced and a high-grade Ti—Al alloy can be obtained at a high yield.

Solution to Problem

In order to solve the problem, the following technical process is conducted in the method for producing a Ti—Al alloy.

A method for producing a Ti—Al alloy of the present invention contains adding a flux, which contains calcium oxide and 35 wt. % or more of calcium fluoride, to a melting raw material composed of a titanium material and an aluminum material and having a blending amount of Al of 50 mass % or more, adding the melting raw material, to which the flux has been added, to a water-cooled copper crucible with a discharging hole formed at a bottom portion, induction-melting the added melting raw material in the water-cooled copper crucible under an atmosphere of 1.33 Pa or more, discharging the melting raw material, which has been induction-melted in the water-cooled copper crucible, downward from the discharging hole to separate the flux containing oxygen liberated from the melting raw material by the induction-melting, and casting the melting raw material, from which the flux has been separated, to obtain the Ti—Al alloy, in which before the casting, an output of the induction-melting is reduced to be 90% or less of an output at melting, and the melting raw material is discharged from the water-cooled copper crucible in a state where the output has been reduced.

A method for producing a Ti—Al alloy of the present invention contains adding a melting raw material, which is composed of a titanium material and an aluminum material and has a blending amount of Al of 50 mass % or more, to a water-cooled copper crucible with a discharging hole formed at a bottom portion, induction-melting the added melting raw material in the water-cooled copper crucible under an atmosphere of 1.33 Pa or more, discharging the melting raw material, which has been induction-melted in the water-cooled copper crucible, downward from the discharging hole to separate a deoxidation product liberated from the melting raw material by the induction-melting, and casting the melting raw material, from which the deoxidation product has been separated, to obtain the Ti—Al alloy, in which before the casting, an output of the induction-melting is reduced to be 90% or less of an output at melting, and the melting raw material is discharged from the water-cooled copper crucible in a state where the output has been reduced.

It is preferable that when performing the casting, a mixture obtained by adding titanium for dilution to the melting raw material discharged downward is added to a crucible for casting and the casting is performed.

Advantageous Effects of Invention

According to the method for producing a Ti—Al alloy of the present invention, the oxygen content of the produced Ti—Al alloy can be further reduced, and a high-grade Ti—Al alloy can be obtained at a high yield. That is, according to the present invention, a high-grade Ti—Al alloy having a low oxygen content can be obtained at a high yield by leaving a deoxidation product and a flux in a melting raw material in a water-cooled copper crucible as much as possible and discharging downward only a molten metal which has a low oxygen content and from which the deoxidation product and the flux have been separated.

DESCRIPTION OF EMBODIMENTS

Embodiments of a method for producing a Ti—Al alloy according to the present invention will be described below in detail with reference to the drawings.

Figure 1:
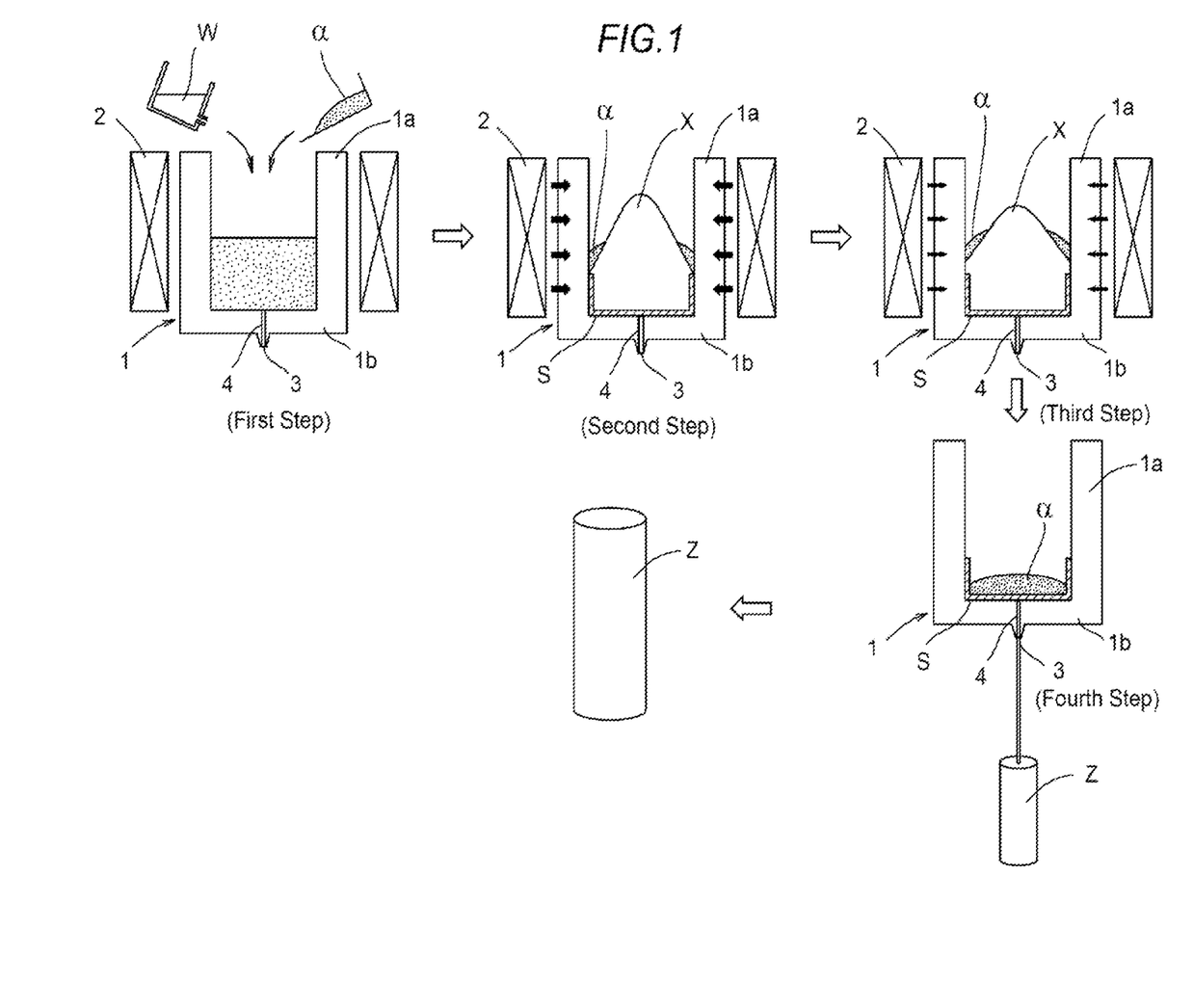
FIG. 1 is a diagram showing a procedure of a method for producing a Ti—Al alloy in which a flux is added to obtain the Ti—Al alloy.

As shown in FIG. 1, in the method for producing a Ti—Al alloy of the present embodiment, four steps of a first step to a fourth step are performed to produce a cast slab of a high-grade Ti—Al alloy Z having an oxygen content of less than 0.06 mass % from an alloy material W for a Ti—Al alloy containing 0.08 mass % or more of oxygen.

Specifically, the alloy material W used in the method for producing the Ti—Al alloy Z is a mixture of a titanium material and an aluminum material, and the titanium material is deoxidized during melting by the action of aluminum contained in the alloy material W.

Figure 2:
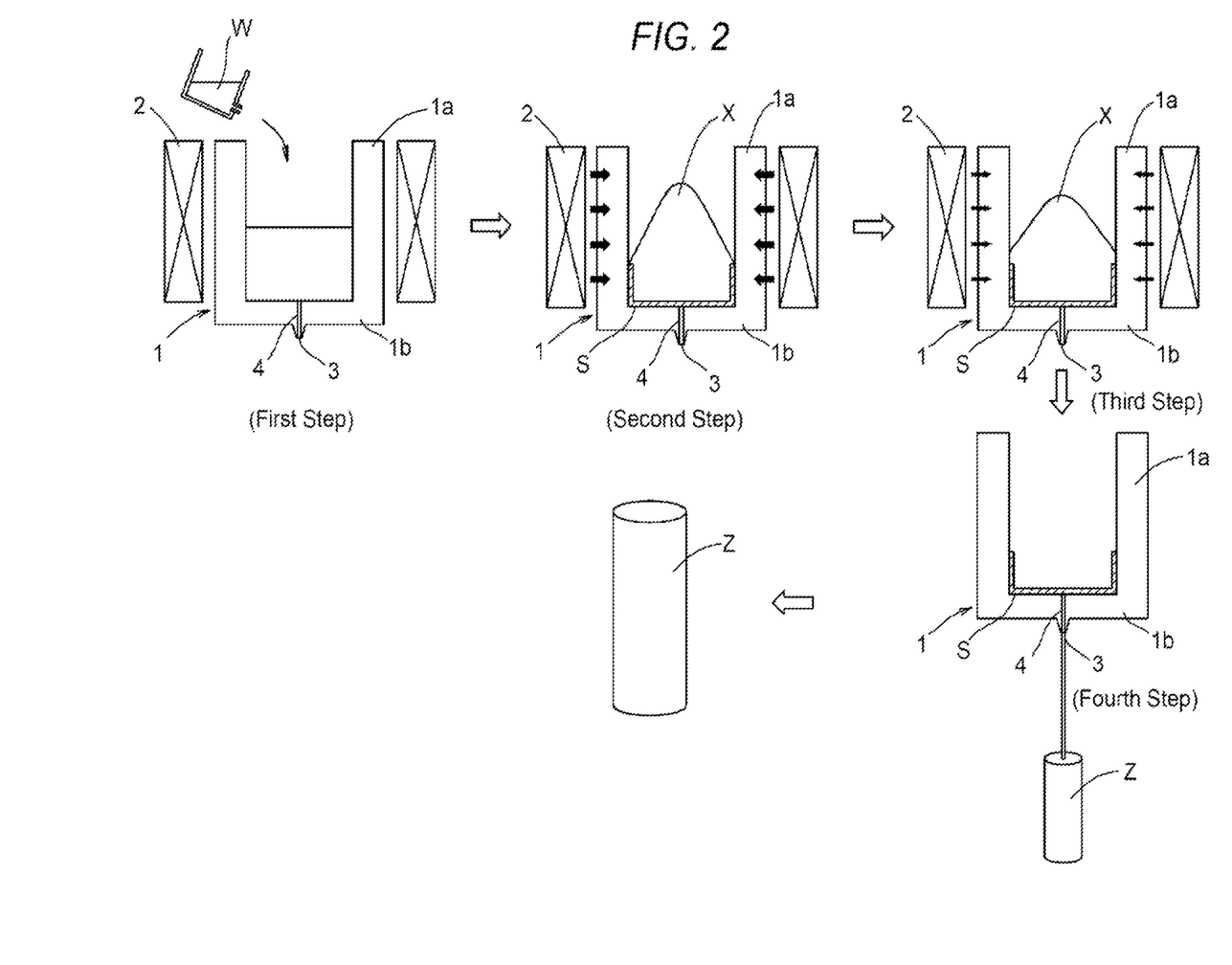
FIG. 2 is a diagram showing a procedure of a method for producing a Ti—Al alloy in which a Ti—Al alloy is obtained without adding a flux.

The method for producing a Ti—Al alloy according to the present invention includes two cases: a case where a flux α is added to the alloy material W and deoxidation is performed in the presence of the flux α (see FIG. 1); and a case where the flux α is not added and deoxidation is performed only by the action of aluminum (see FIG. 2). In the following description, the producing method of the present invention will be described with a case where the flux α is added and deoxidation is perform as a producing method of a first embodiment, and a case where deoxidation is performed without adding the flux α as a producing method of a second embodiment.

First Embodiment

In the producing method of the first embodiment described above, the alloy material W containing 0.08 mass % or more of oxygen is subjected to processes of a first step to a fourth step to finally obtain a high-grade Ti—Al alloy Z containing less than 0.06 mass % of oxygen.

Hereinafter, each of the first to fourth steps constituting the method for producing the Ti—Al alloy Z of the first embodiment will be described.

In the first step, the alloy material W of which the component has been adjusted and the flux α are supplied to a water-cooled copper vessel 1.

The alloy material W described above is obtained by adding an aluminum material to a titanium material, and is in a state where these have already been mixed. The alloy material W in the molten state is accommodated in a vessel or the like from which the alloy material W can be poured into the water-cooled copper vessel 1 described later, and is supplied to (poured into) the water-cooled copper vessel 1 for deoxidation.

Specifically, the alloy material W contains 0.08 mass % or more of oxygen (O) in total and 50 mass % or more of aluminum (Al). That is, the titanium material constituting the alloy material W contains titanium oxide ($TiO_2$) such as a sponge titanium, a scrap raw material, and rutile ore, which are classified into a low grade titanium material and contain a large amount of oxygen. The reason why the low-grade titanium material is used for the alloy material W is that these titanium materials are inexpensive and easily procured. The aluminum material constituting the alloy material W is a waste material or a scrap of a Ti—Al alloy having a large aluminum content. It is preferable that an aluminum material with a high aluminum content is used or aluminum is added directly during melting so that aluminum (Al) is contained in the amount of 50 mass % or more in the alloy material W.

In the alloy material W described above, a total content of oxygen is 0.08 mass % or more. For example, in a case where the total content of oxygen in the alloy material W is less than 0.08 mass %, the oxygen content is small and deoxidation itself is not necessary. In the present invention, the upper limit of the oxygen content is not specified, but the upper limit of the total content of oxygen actually contained in the alloy material W is considered to be about 25 mass %.

The reason why the Ti—Al alloy containing 50 mass % or more of Al is used for the alloy material W which is subjected to deoxidization in the first step is as follows.

For example, according to a common ternary phase diagram of Ti—Al—O (see, for example, FIG. 5 of WO 2016/035824 A1), for the maximum amount of oxygen that can be dissolved in the Ti—Al alloy, the larger the Al content in the Ti—Al alloy Z is, the lower the dissolved oxygen concentration tends to be.

That is, even in the case of the alloy material W of the Ti—Al alloy produced using the low-grade titanium material, oxygen in the alloy material W can be lowered to an extremely low concentration of "0.08 mass % or more" by deoxidation if the Al content is increased to 50 mass % or more. For example, if the Al content in the alloy material W is 40 mass %, the oxygen concentration of the produced Ti—Al alloy exceeds 0.1 mass %, which is insufficient as a practical alloy material W. However, if the Al content in the alloy material W is increased to 50 mass % or more, the concentration of oxygen in the alloy material W can be lowered to an extremely low concentration of "0.08 mass % or more", and a sufficiently practical alloy material W can be obtained.

The flux α described above has a function of reducing the activity of $Al_2O_3$ in the alloy material W by being added to the alloy material W and promoting the deoxidation reaction in the second step. That is, the flux α has an effect of reducing the activity of $Al_2O_3$, which is a generation species in the deoxidation reaction, by melting $Al_2O_3$, which is a deoxidation product of the Ti—Al alloy, and promoting the deoxidation reaction.

The melting of $Al_2O_3$ in the flux α occurs only in a state where the flux α melts. Therefore, when a melting point of the flux α is too high, the flux α does not melt, and melting of the $Al_2O_3$ does not occur. That is, in the flux α of CaO—$CaF_2$, it is necessary to decrease the melting point of the flux α by increasing the content of $CaF_2$ or the like. Therefore, in the deoxidation of the present embodiment, the content of $CaF_2$ in the flux α is set to 35 mass % or more so that the melting point of the flux α becomes 1800 K or less. In addition, the content of $CaF_2$ in the flux α is set to less than 95 mass % so that the Ti—Al alloy Z obtained as a product is not contaminated with fluorine of $CaF_2$.

The amount of the CaO—$CaF_2$ flux α to be added to the alloy material W is 3 mass % to 20 mass % with respect to the Ti—Al alloy Z. When the addition amount with respect to the Ti—Al alloy Z is less than 3 mass %, the $Al_2O_3$ activity does not decrease so much, and deoxidation promoting effect is hardly obtained. When the addition amount with respect to the Ti—Al alloy Z is more than 20 mass %, the risk in which the added flux α remains in the produced Ti—Al alloy Z increases.

In the method for producing a Ti—Al alloy of the present invention, an induction melting furnace of a bottom-discharging type water-cooled copper crucible (hereinafter referred to as the water-cooled copper vessel 1) is used for a vessel into which the alloy material W and the flux α described above are put. The water-cooled copper vessel 1 is formed of copper having good thermal conductivity and is formed in a bottomed cylindrical shape opening upward. Specifically, the water-cooled copper vessel 1 has a tubular (cylindrical) side wall 1a which is opened up and down, and a bottom wall 1b which closes a lower opening of the side wall 1a. The induction heating coil 2 is provided outside the side wall 1a so as to be able to induction-heat the alloy material W in the vessel.

Further, a discharging hole 3 is formed at the bottom wall 1b, and a guide flow path 4 that guides the molten metal in the vessel downward is formed at the upper side of the discharging hole, so that the molten metal in the vessel can be discharged downward (bottom). The discharging from the discharging hole 3 is performed by casting in the fourth step.

The second step is a step of induction-melting the alloy material W in the water-cooled copper vessel 1 so that deoxidation is promoted, the alloy material W being put in the first step.

Specifically, since the deoxidation performed in the second step described above realizes lower oxygen by increasing the Al content, the atmosphere for deoxidation does not necessarily have to be a high vacuum. That is, even in an atmosphere other than a high vacuum atmosphere, specifically, an atmosphere of 1.33 Pa or more, deoxidation can be sufficiently performed. In addition, when the deoxidation is performed under an atmosphere of 1.33 Pa or more, a volatilization loss of Al or Ti does not occur unlike the deoxidation under a high vacuum atmosphere. That is, in the second step of performing deoxidation under an atmosphere of 1.33 Pa or more, which is not a high vacuum atmosphere, it is possible to easily produce a low-oxygen Ti—Al alloy (high-grade Ti—Al alloy) having a target composition while reducing the volatilization loss of Al and Ti (substantially without reducing the content of Ti).

Specifically, melting of a primary slab X in the second step is performed under the condition where the inside of the water-cooled copper vessel 1 is adjusted from the atmospheric pressure to an atmosphere of 1.33 Pa or more, preferably an atmosphere of 10 Pa or more, and more preferably an atmosphere of $5.33 \times 10^5$ Pa($\approx$5 atmospheres).

When melting the primary slab X in the second step, it is preferable to sufficiently stir in the vessel 1 to promote the deoxidation reaction. Since the flux α described above is difficult to mix with the alloy material W in principle, a part of the alloy material W may not melt if stirring is not performed. Therefore, it is preferable to uniformly melt the flux α in the alloy material W by stirring.

The deoxidation described above is performed as follows. That is, induction heating is performed by applying an induction current to the induction heating coil 2 provided in the water-cooled copper vessel 1 described above, and the alloy material W in the vessel 1 is melted. Here, in the melting alloy material W melted by induction heating, oxygen of titanium oxide contained in the titanium material reacts with aluminum of the aluminum material to form $Al_2O_3$, and deoxidation proceeds. By this deoxidation, $Al_2O_3$ is formed in the alloy material W. With the formation of $Al_2O_3$, metal Ti is formed in the alloy material W.

Metal Ti formed by the deoxidation, metal Ti contained in the titanium material, and metal Al contained in the aluminum material are subjected to Lorentz forces due to the influence of a magnetic field generated by a coil, and are subjected to forces directed toward the center of the vessel 1. As a result, the metal titanium alloy tends to be collected at the center (center side) of the water-cooled copper vessel 1.

Hereinafter, a material obtained by melting and mixing metal Ti and Al is referred to as a "titanium alloy". That is, in the present specification, the term "titanium alloy" is used separately as a term indicating a material whose properties are clearly different from those of the Ti—Al alloy described later, which is produced through deoxidation.

Meanwhile, $Al_2O_3$ which is an oxide or the oxide contained in the flux is not a conductor, and no Lorentz force is applied thereto. Therefore, the oxide is pushed out by the titanium alloy moving to the center of the vessel and tends to be collected on the outside of the water-cooled copper vessel 1.

As shown in FIG. 1, as a result, in the water-cooled copper vessel 1 in which the deoxidation is performed, the deoxidation is performed in a state where $Al_2O_3$ rich in oxygen to be removed by the Lorentz force is unevenly distributed on the outer peripheral side in the vessel 1 and a titanium alloy containing almost no oxygen to be left is unevenly distributed on the center side in the vessel 1. That is, inside the induction-heated water-cooled copper vessel 1, the titanium alloy containing almost no oxygen is collected on the center side of the vessel 1. Therefore, when only the portion on the center side can be extracted by removing the portion on the outer peripheral side, which is rich in oxides, effective deoxidation can be achieved.

Here, the water-cooled copper vessel 1 of the present invention has a structure in which the outer peripheral side in the vessel 1 is rapidly cooled by water cooling, and the molten metal present on the center side of the vessel 1 is thermally or substantively blocked from the vessel walls 1a and 1b by using a solidified skull S formed at the outer peripheral side of the vessel 1 by rapid cooling. In other words, the alloy material W in the portion close to a vessel wall of the water-cooled copper vessel 1 is solidified due to the influence of heat removal to form the solidified skull S. The solidified skull S is obtained by solidifying the alloy material W rich in $Al_2O_3$ which is an oxide or oxide contained in the flux α. That is, when only the metal titanium alloy collected on the center side of the vessel 1 can be discharged outside of the vessel while leaving the solidified skull S in the water-cooled copper vessel 1 as much as possible, a high-grade titanium alloy can be obtained.

Meanwhile, since the flux α described above has a specific gravity smaller than that of the alloy material W, the flux α floats at a surface of the alloy material W. Since the flux α contains not only $Al_2O_3$, which is a deoxidation product, but also a metal oxide or the like originally blended, a high-grade titanium alloy can be obtained when the floating flux α can be separated from the alloy material W and only the metal titanium alloy present below the flux α can be discharged outside of the vessel.

As means for separating the floating flux α from the alloy material W, a bottom-discharging method in the fourth step is adopted in the producing method of the present invention. In the producing method of the present invention, before the bottom-discharging method in the fourth step is performed, the following third step is performed in order to further enhance the effect of the bottom-discharging. That is, the third step and the fourth step described below are features of the producing method of the present invention.

In the third step described above, prior to performing the casting in the fourth step, an output of induction melting is reduced to 90% or less of the output at the time of melting in the second step. The reason why such a third step is provided is to promote the growth of the solidified skull S described above by the reduction in the output of the induction melting, and to increase an amount of the oxide $Al_2O_3$ trapped by the solidified skull S or an amount of the oxide or the like contained in the flux. In other words, by weakening the output of the induction melting, the solidified skull S of the vessel wall is likely to protrude, and the oxide described above is likely to be trapped, as a process in which the solidified skull is generated. Further, even when the stirring speed of the metal is too fast, it becomes difficult for the solidified skull S to trap the oxide. However, as described above, when the output of the induction melting is reduced to 90% or less, the stirring speed is also reduced, and the oxide is more likely to be trapped. The reason why the oxide (flux) tends to exist at the outer peripheral side of the vessel 1 in this way is due to the Lorentz force. Since the Lorentz force causes the titanium alloy (metal) to enter the center side of the vessel 1, other substances such as oxide are ejected toward the outer peripheral side of the vessel 1. As a result of ejecting the oxide or the like toward the outer peripheral side in this way, the solidified skull S is generated on the side close to the vessel wall.

That is, by performing the third step, a larger amount of impurities can be removed, and a titanium alloy having high-grade (in which the concentration of oxygen is further reduced) can be obtained.

In addition, the reduction in the output of induction melting also has an effect of weakening the stirring of the molten metal in the vessel 1. That is, when the stirring of the molten metal is weakened, the oxide such as $Al_2O_3$ flowing in the vessel by the stirring loses momentum and is likely to be trapped by the solidified skull S.

As a result, by performing the third step described above, the oxide such as $Al_2O_3$ contained in the alloy material W is more likely to be trapped by the solidified skull S, and the separation of the metal and the impurity in the vessel 1 proceeds, so that the high-grade titanium alloy is more likely to be obtained in the fourth step.

The fourth step is a step of discharging (hereinafter, may be referred to as bottom-discharging) the molten metal in the vessel 1 downward from the guide flow path 4 and the discharging hole 3 described above. When such bottom-discharging is adopted in the fourth step, only the metal titanium alloy can be pulled out downward while the solidified skulls S described above are fixed to the vessel walls 1a and 1b, and the metal can be separated from the impurities. In addition, when the bottom-discharging is stopped at appropriate timing, it is possible to prevent impurities such as the flux α floating at the surface from flowing into the guide flow path 4, and it is possible to separate only the metal titanium alloy from the alloy material W while leaving the floating flux α and the like in the vessel 1.

Since the oxides such as $Al_2O_3$, which are impurities, are sufficiently removed from the molten metal discharged downward in the fourth step described above, it is possible to obtain a high-grade Ti—Al alloy Z having oxygen of less than 0.06 mass % by casting the molten metal. Thus, the Ti—Al alloy Z having less than 0.06 mass % of oxygen sufficiently clears a standard of the oxygen concentration of 700 ppm or less or 600 ppm or less, which is a general product level (final concentration), and can satisfy many product levels.

By performing the first to fourth steps described above, it is possible to discharge downward only the molten metal which has a low oxygen content and from which the deoxidation product and the flux α are separated while leaving the deoxidation product and the flux α in the alloy material W (melting raw material) in the water-cooled copper vessel 1 (water-cooled copper crucible) as much as possible, and it is possible to obtain a high-grade Ti—Al alloy having a low oxygen content at a high yield.

In addition, in the case of a discharging method such as a tilting method, it is necessary to use mechanical means such as shot blasting for the cast slab, and a problem of causing a decrease in yield has been pointed out. However, according to the producing method of the first embodiment described above, it is possible to obtain a high-grade Ti—Al alloy having a further reduced oxygen content at a high yield without using a mechanical means for causing a reduction in yield.

Second Embodiment

Next, a method for producing a Ti—Al alloy of a second embodiment will be described.

In the method for producing a Ti—Al alloy of the second embodiment, in the first step, the flux α is not added, and only the alloy material W is supplied to the vessel 1. In the method for producing a Ti—Al alloy of the second embodiment, the flux α is not added, and thus the flux α does not float at a surface in a second step.

In a third step, the growth of the solidified skull S is promoted by the reduction in an output of induction melting, and an amount of impurities trapped in the solidified skull S increases. In addition, in a fourth step, only the metal titanium alloy is cast while the solidified skull S is left at the vessel wall by the bottom-discharging, so that it is possible to obtain a high-grade Ti—Al alloy Z having less than 0.06 mass % of oxygen as in the first embodiment.

The features, actions, and effects of the second embodiment other than those described above are the same as those of the first embodiment. Therefore, description of the same features, functions, and effects as those of the first embodiment will be omitted.

EXAMPLE

Next, the effects of the method for producing a Ti—Al alloy of the present invention will be described in detail with reference to Comparative Examples and Examples.

In Examples and Comparative Examples, two types, which are an induction melting furnace of a bottom-discharging type water-cooled copper crucible and an induction melting furnace of a tilted-discharging type water-cooled copper crucible, were prepared, deoxidation was performed using each furnace, and cast was performed after the deoxidation to obtain a cast slab.

The alloy material W to be deoxidized and cast is obtained by adding, for example, 1000 series aluminum as an aluminum material to a titanium alloy of Ti-33 Al-4.8Nb-2.5Cr as a titanium material. The alloy material W in which an aluminum concentration was increased from 36.78 wt. % to 55.4 wt. % due to the addition of the aluminum material was used as test materials for Comparative Examples and Examples described above.

In the induction melting furnace of the water-cooled copper crucible described above, an inner diameter of the vessel 1 (crucible) was 250 mm. A bottom-discharging type having the discharging hole 3 formed at the bottom wall 1b was used. In the induction melting furnace of the water-cooled copper crucible (water-cooled copper vessel 1), the inside of the vessel is depressurized (vacuumed) to $1\times10^{-3}$ [Torr], and argon gas is introduced into the vessel to form an Ar atmosphere in both the bottom-discharging type and the tilted-discharging type. The molten metal, i.e., the alloy material W having melting amount (melting weight) of 40 kg to 50 kg, was supplied to the induction melting furnace of the water-cooled copper crucible, and deoxidation and casting of Examples and Comparative Examples were performed.

Further, in the case of using any of the melting furnaces, a level in which the flux α was added and deoxidation was performed and a level in which the flux α was not added and deoxidation was performed were prepared. As the flux α, a flux containing 20% of CaO and 80% of $CaF_2$ in mass % was used.

When the induction melting furnace of the bottom-discharging type water-cooled copper crucible (water-cooled copper vessel 1) was used, casting was performed at a casting speed of 60 g/sec to 90 g/sec. The casting speed is a speed at which 7 minutes to 10 minutes are required to discharge all of 40 kg to 50 kg of the molten metal.

Further, in the case of using the induction melting furnace of the tilted-discharging type water-cooled copper crucible, the casting speed is a speed at which the casting is finished about 5 seconds at the maximum.

Finally, in Comparative Example 1, deoxidation was performed by using the induction melting furnace of the tilted-discharging type water-cooled copper crucible while the flux α was added. In Comparative Example 2, deoxidation was performed by using the induction melting furnace of the bottom-discharging type water-cooled copper crucible (water-cooling copper vessel 1) while the flux α was added. In Comparative Example 3, deoxidation was performed without adding the flux α by using the induction melting furnace of the tilted-discharging type water-cooling copper crucible (water-cooling copper vessel 1). In Comparative Example 4, deoxidation was performed without adding the flux α by using the induction melting furnace of the bottom-discharging type water-cooling copper crucible (water-cooling copper vessel 1). In Example 1, the flux α was added and deoxidization was performed by using the induction melting furnace of the bottom-discharging type water-cooled copper crucible (water-cooling copper vessel 1) while an output of induction melting was reduced. In Example 2, deoxidation was performed without adding flux α by using the induction melting furnace of the bottom-discharging type water-cooled copper crucible (water-cooled copper vessel 1) while an output of induction melting is reduced.

The results of Comparative Examples 1 to 4 and Examples 1 and 2 described above are shown in Table 1.

TABLE 1

| | Use Facility (discharging type) | With or without flux addition | Output control before casting | Oxygen concentration [mass %] |
|---|---|---|---|---|
| Comparative Example 1 | CCIM facility (tilted-discharging) | Yes | No | 0.042 |
| Comparative Example 2 | CCIM facility (bottom-discharging) | | No | 0.056 |
| Example 1 | CCIM facility (bottom-discharging) | | Yes | 0.039 |

TABLE 1-continued

| | Use Facility (discharging type) | With or without flux addition | Output control before casting | Oxygen concentration [mass %] |
|---|---|---|---|---|
| Comparative Example 3 | CCIM facility (tilted-discharging) | No | No | 0.065 |
| Comparative Example 4 | CCIM facility (bottom-discharging) | | No | 0.044 |
| Example 2 | CCIM facility (bottom-discharging) | | Yes | 0.042 |

Referring to Table 1 described above, in Example 1 in which an output control before casting was performed and the flux α was also added, the flux α added together with the aluminum material was attached to the solidified shell (solidified skull S) formed at the bottom wall 1b of the water-cooled copper crucible (water-cooled copper vessel 1) at the time of discharging of a first melting, and was neither mixed nor suspended in the titanium-aluminum material (Ti—Al alloy Z) produced (casted) by discharging. Therefore, when the molten metal of Example 1 is used as a melting raw material and titanium for dilution or the like is added to perform a second melting, the oxygen concentration decreases to 0.039 wt. %.

In contrast, in Comparative Example 1 in which a CCIM facility for discharging by a tilting method was used or in Comparative Example 2 in which an output control before casting in the third step was not performed even though a CCIM facility for a bottom-discharging method was used, the contained oxygen concentration is increased (deteriorated) to 0.042 wt. % or 0.056 wt. %, and it is difficult to obtain the high-grade Ti—Al alloy Z having a small oxygen content at a high yield.

In Example 2 in which the output control before casting in the third step is performed, but the flux α was not added, almost no flux α is formed at the surface. The impurities such as oxides mixed together with the aluminum material are trapped in the solidified shells (solidified skulls S) formed at the side wall 1a and the bottom wall 1b of the water-cooled copper crucible (water-cooled copper vessel 1) at the time of discharging of the first melting. Therefore, when the molten metal of Example 2 is used as a melting raw material and titanium for dilution or the like is added to perform the second melting, the oxygen concentration decreases to 0.042 wt. %.

In contrast, in Comparative Example 3 in which a CCIM facility for discharging by a tilting method was used or in Comparative Example 4 in which a CCIM facility for a bottom-discharging method was used, but an output control before casting in the third step was not performed, the oxygen concentration is increased (deteriorated) to 0.065 wt. % or 0.044 wt. %, and it is difficult to obtain the high-grade Ti—Al alloy Z having a small oxygen content at a high yield.

In Example 2, although the oxygen concentration was slightly higher than that in Example 1, the raw material cost was low because no flux was used, and thus Example 2 was superior to Example 1 in terms of producing cost.

It should be understood that the embodiments disclosed herein are illustrative and non-restrictive in all respects. In particular, in the embodiments disclosed herein, items that are not explicitly disclosed, for example, operating conditions, operational conditions, various parameters, and dimensions, weights, volumes, and the like of components do not depart from the scope of normal implementation by those skilled in the art, and values that can be easily assumed by those skilled in the art are adopted.

The present application is based on Japanese Patent Application No. 2020-016221 filed on Feb. 3, 2020, and the contents thereof are incorporated herein by reference.

REFERENCE SIGNS LIST

1 Water-cooled copper crucible (water-cooled copper vessel)
1a Side wall of water-cooled copper crucible (vessel wall)
1b Bottom wall of water-cooled copper crucible (vessel wall)
2 Coil
3 Discharging hole
4 Guide flow path
S Solidified shell (solidified skull)
W Alloy material
Z Ti—Al alloy
α Flux

The invention claimed is:

1. A method for producing a Ti—Al alloy, the method comprising:
    adding a flux, comprising calcium oxide and 35 wt. % or more of calcium fluoride, to a melting raw material comprising a titanium material and an aluminum material and having a blending amount of Al of 50 wt. % or more, to obtain an added melting raw material;
    adding the melting raw material to a water-cooled copper crucible with a discharging hole formed at a bottom portion;
    induction-melting the added melting raw material in the water-cooled copper crucible under an atmosphere of 1.33 Pa or more, to obtain an induction melted raw material;
    discharging the induction melted melting raw material downward from the discharging hole to separate the flux comprising oxygen liberated from the melting raw material by the induction-melting, to obtain a separated melting raw material and
    casting the separated melting raw material to obtain the Ti—Al alloy,
    wherein, before the casting, an output of the induction-melting is reduced to be 90% or less of an output at melting, and
    wherein the separated melting raw material is discharged from the water-cooled copper crucible in a state where the output has been reduced.

2. The method of claim 1, wherein the casting comprises obtaining a mixture by adding titanium for dilution to the separated melting raw material discharged downward to a crucible for casting and performing the casting.

3. The method of claim 1, wherein the melting raw material is composed of the titanium material and the aluminum material and has the blending amount of 50 wt. % or more Al.

4. A method for producing a Ti—Al alloy, the method comprising:
   adding a melting raw material, comprising a titanium material and an aluminum material and having a blending amount of 50 wt. % Al or more, to a water-cooled copper crucible with a discharging hole formed at a bottom portion, to obtain an added melting raw material;
   induction-melting the added melting raw material in the water-cooled copper crucible under an atmosphere of 1.33 Pa or more, to obtain an induction-melted raw material;
   discharging the induction-melted raw material downward from the discharging hole to separate a deoxidation product liberated from the melting raw material by the induction-melting, to obtain an separated melting raw material; and
   casting the separated melting raw material to obtain the Ti—Al alloy,
   wherein, before the casting, an output of the induction-melting is reduced to be 90% or less of an output at melting, and
   wherein the separated melting raw material is discharged from the water-cooled copper crucible in a state where the output has been reduced.

5. The method of claim 4, wherein the casting comprises obtaining a mixture by adding titanium for dilution to the separated melting raw material discharged downward to a crucible for casting and performing the casting.

6. The method of claim 4, wherein the melting raw material is composed of the titanium material and the aluminum material and has the blending amount of 50 wt. % or more Al.

* * * * *

UNITED STATES PATENT AND TRADEMARK OFFICE
CERTIFICATE OF CORRECTION

| | | |
|---|---|---|
| PATENT NO. | : 12,152,288 B2 | Page 1 of 1 |
| APPLICATION NO. | : 17/758948 | |
| DATED | : November 26, 2024 | |
| INVENTOR(S) | : Daisuke Matsuwaka et al. | |

It is certified that error appears in the above-identified patent and that said Letters Patent is hereby corrected as shown below:

On the Title Page

Items (71) and (73) should read:
--(71) Applicant: Kabushiki Kaisha Kobe Seiko Sho (Kobe Steel, Ltd.), Kobe-shi (JP)--
--(73) Assignee: Kabushiki Kaisha Kobe Seiko Sho (Kobe Steel, Ltd.), Kobe-shi (JP)--

Signed and Sealed this
Seventh Day of January, 2025

Derrick Brent
*Acting Director of the United States Patent and Trademark Office*